(12) United States Patent
Nakatsuka et al.

(10) Patent No.: US 10,971,749 B2
(45) Date of Patent: Apr. 6, 2021

(54) METHOD OF AND APPARATUS FOR PRODUCING MEMBRANE ELECTRODE ASSEMBLY

(71) Applicant: HONDA MOTOR CO., LTD., Tokyo (JP)

(72) Inventors: Hiroyuki Nakatsuka, Tochigi-ken (JP); Seiichi Kouketsu, Tochigi-ken (JP); Masaya Igaki, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 219 days.

(21) Appl. No.: 16/013,970

(22) Filed: Jun. 21, 2018

(65) Prior Publication Data
US 2018/0375138 A1   Dec. 27, 2018

(30) Foreign Application Priority Data
Jun. 26, 2017   (JP) .............................. JP2017-123895

(51) Int. Cl.
| | |
|---|---|
| *H01M 8/1004* | (2016.01) |
| *H01M 8/1069* | (2016.01) |
| *H01M 8/04701* | (2016.01) |
| *H01M 8/0297* | (2016.01) |
| *H01M 4/86* | (2006.01) |
| *H01M 8/1018* | (2016.01) |
| *H01M 4/88* | (2006.01) |

(52) U.S. Cl.
CPC ....... *H01M 8/1004* (2013.01); *H01M 8/0297* (2013.01); *H01M 8/04731* (2013.01); *H01M 8/1069* (2013.01); *H01M 4/8605* (2013.01); *H01M 4/8807* (2013.01); *H01M 2004/8684* (2013.01); *H01M 2004/8689* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 5,620,807 A | * | 4/1997 | Mussell | H01M 4/926 |
| | | | | 429/514 |
| 2003/0188413 A1 | * | 10/2003 | Mlinar | H01M 8/2465 |
| | | | | 29/411 |

FOREIGN PATENT DOCUMENTS

JP   2009-283241   12/2009

* cited by examiner

*Primary Examiner* — Wyatt P McConnell
(74) *Attorney, Agent, or Firm* — Amin, Turocy & Watson, LLP

(57) ABSTRACT

A method of producing an MEA includes a first joining step of joining an anode to one surface of a solid polymer electrolyte membrane to thereby form a joint body and a second joining step of joining a cathode to another surface of the solid polymer electrolyte membrane. In the first joining step, the solid polymer electrolyte membrane is attracted by suction and heated through the anode placed on a suction/heating surface of a suction/heating plate. In the second joining step, a stack body of the joint body and the cathode is pressed and heated in a stacking direction, between the suction/heating surface and a heating plate.

3 Claims, 13 Drawing Sheets

METHOD OF AND APPARATUS FOR PRODUCING MEMBRANE ELECTRODE ASSEMBLY

CROSS-REFERENCE TO RELATED APPLICATION

This application is based upon and claims the benefit of priority from Japanese Patent Application No. 2017-123895 filed on Jun. 26, 2017, the contents of which are incorporated herein by reference.

BACKGROUND OF THE INVENTION

Field of the Invention

The present invention relates to a method of, and an apparatus for producing a membrane electrode assembly containing a solid polymer electrolyte membrane, a porous first electrode, and a porous second electrode, the first and second electrodes being joined to respective both surfaces of the solid polymer electrolyte membrane.

Description of the Related Art

A unit cell of a solid polymer electrolyte fuel cell is formed by sandwiching a membrane electrode assembly between a pair of separators. The membrane electrode assembly includes a solid polymer electrolyte membrane, and a first electrode and a second electrode joined to respective both surfaces of the solid polymer electrolyte membrane. The solid polymer electrolyte membrane is a polymer ion exchange membrane.

Each of the first electrode and the second electrode has porosity, and includes an electrode catalyst layer and a gas diffusion layer. The electrode catalyst layer faces the solid polymer electrolyte membrane, and plays a role of a reaction field where electrode reactions occur. A reaction gas is diffused through the gas diffusion layer, and supplied to the electrode catalyst layer.

For the purpose of producing this type of membrane electrode assembly, for example, a production method disclosed in Japanese Laid-Open Patent Publication No. 2009-283241 is known. In this production method, a stack body is formed by placing a solid polymer electrolyte membrane between a first electrode and a second electrode, and the stack body is subjected to hot pressing by pressing heated dies against both sides of the stack body in a stacking direction. In this manner, it is possible to transmit the heat of the dies to the solid polymer electrolyte membrane through the first electrode and the second electrode, and then, the first electrode and the second electrode are joined integrally to the solid polymer electrolyte membrane, to thereby obtain the membrane electrode assembly.

SUMMARY OF THE INVENTION

However, it is difficult to stack the first electrode, the solid polymer electrolyte membrane, and the second electrode together in a desired positional relationship and then perform hot pressing while maintaining the positional relationship. Therefore, in the above production method, there is a concern that the first electrode, the solid polymer electrolyte membrane, and the second electrode might be joined together with positional deviation.

In order to suppress such positional deviation, for example, it may be considered to firstly join the first electrode on one surface of the solid polymer electrolyte membrane and fixedly position the solid polymer electrolyte membrane and the first electrode together, and thereafter join the second electrode on the other surface of the solid polymer electrolyte membrane. However, in the above production method, in the case where the first electrode is joined to the one surface of the solid polymer electrolyte membrane, hot pressing is performed by directly bringing a die into contact with the other surface of the solid polymer electrolyte membrane. Consequently, for example, the softened solid polymer electrolyte membrane adheres to the die, and thus, it is difficult to obtain the membrane electrode assembly itself.

A main object of the present invention is to provide a method of producing a membrane electrode assembly in which it is possible to easily obtain a membrane electrode assembly while suppressing positional deviation between a first electrode, a solid polymer electrolyte membrane, and a second electrode, and deformation of the solid polymer electrolyte membrane.

Another object of the present invention is to provide an apparatus for producing a membrane electrode assembly in which it is possible to easily obtain a membrane electrode assembly while suppressing positional deviation between a first electrode, a solid polymer electrolyte membrane, and a second electrode, and deformation of the solid polymer electrolyte membrane.

According to one aspect of the present invention, there is provided a method of producing a membrane electrode assembly including a solid polymer electrolyte membrane, a porous first electrode and a porous second electrode, the first electrode and the second electrode being joined to respective both sides of the solid polymer electrolyte membrane. Each of the first electrode and the second electrode includes a gas diffusion layer and an electrode catalyst layer. The method includes a first joining step of attracting by suction and heating the solid polymer electrolyte membrane stacked on the first electrode, through the first electrode placed on a suction/heating surface of a suction/heating plate having a suction unit and a heating unit, and then joining the first electrode to one surface of the solid polymer electrolyte membrane to thereby form a joint body, and a second joining step of pressing and heating a stack body including the solid polymer electrolyte membrane of the joint body and the second electrode stacked together, in the stacking direction between the suction/heating surface and a heating plate, to thereby join the second electrode to the other surface of the solid polymer electrolyte membrane.

In the method of producing the membrane electrode assembly, in the first joining step, the first electrode is joined to one surface of the solid polymer electrolyte membrane to thereby fixedly position the solid polymer electrolyte membrane and the first electrode together, and thereafter, in the second joining step, the second electrode is joined to the other surface of the solid polymer electrolyte membrane. In this manner, for example, in comparison with the case where the first electrode, the solid polymer electrolyte membrane, and the second electrode are simply stacked together, and subjected to hot pressing, it is possible to easily suppress positional deviation between these components.

Further, in the first joining step, the solid polymer electrolyte membrane is attracted by suction and heated through the porous first electrode from the suction/heating surface. Therefore, one surface of the solid polymer electrolyte membrane can be pressed against the first electrode and heated to thereby join the solid polymer electrolyte membrane and the first electrode together in a manner that structural components other than the first electrode do not contact the solid polymer electrolyte membrane. Therefore, as described above, even in the case where the first electrode is joined to one surface of the solid polymer electrolyte membrane, for example, unlike the case of performing hot pressing using a die, the solid polymer electrolyte membrane softened by heating is not adhered to the die.

Further, in the first joining step, a suction force from the suction/heating surface is applied to the solid polymer electrolyte membrane which is stacked together with the first electrode in a desired positional relationship. Therefore, in a state where positional deviation and/or thermal deformation is suppressed, the solid polymer electrolyte membrane is joined to the first electrode. Thus, it is possible to easily suppress thermal deformation of the solid polymer electrolyte membrane.

As described above, in this method of producing the membrane electrode assembly, it is possible to easily suppress positional deviation between the first electrode, the solid polymer electrolyte membrane, and the second electrode, and also easily suppress deformation of the solid polymer electrolyte membrane, whereby the membrane electrode assembly having excellent quality can be obtained.

The method of producing the membrane electrode assembly may further include, between the first joining step and the second joining step, the steps of transferring the joint body from the suction/heating surface to a transportation unit; after the joint body is transferred from the suction/heating surface, placing the second electrode on the suction/heating surface and attracting the second electrode by suction to the suction/heating surface; and stacking the joint body on the second electrode attracted to the suction/heating surface by suction, to thereby form the stack body. In the second joining step, the stack body may be pressed and heated in a state where the solid polymer electrolyte membrane is attracted by suction through the second electrode.

In this case, also in the second joining step, a suction force from the suction/heating surface is applied to the solid polymer electrolyte membrane of the joint body which is stacked together with the second electrode in a desired positional relationship. Thus, in a state where positional deviation and/or thermal deformation is suppressed, the solid polymer electrolyte membrane is joined to the second electrode. Thus, it is possible to more effectively suppress positional deviation between the first electrode, the solid polymer electrolyte membrane, and the second electrode, and also more effectively suppress deformation of the solid polymer electrolyte membrane.

Further, since the joint body is transferred to the transportation unit, by using the suction/heating plate, it is possible to attract the first electrode by suction, attract the solid polymer electrolyte membrane by suction through the first electrode, attract the second electrode by suction, and attract the solid polymer electrolyte membrane (joint body) by suction through the second electrode. In this manner, it is possible to simplify the equipment for producing the membrane electrode assembly.

In the method of producing the membrane electrode assembly, the heating plate may be configured to attract the second electrode by suction. The method may further include, between the first joining step and the second joining step, the step of, in a state where the joint body is attracted to the suction/heating surface by suction, moving the heating plate with the second electrode being attracted by suction thereto, closer to joint body, and then stacking the joint body and the second electrode together to thereby form the stack body. In the second joining step, in a state where the solid polymer electrolyte membrane is attracted by suction through the first electrode and the second electrode by the suction/heating surface and the heating plate, the stack body may be pressed and heated by the suction/heating surface and the heating plate.

In this case, in the second joining step, the solid polymer electrolyte membrane is subjected to the suction force from both of the suction/heating surface and the heating plate. Therefore, in a state where positional deviation and/or thermal deformation is suppressed, the solid polymer electrolyte membrane is joined to the second electrode. Thus, it is possible to more effectively suppress positional deviation between the first electrode, the solid polymer electrolyte membrane, and the second electrode, and also more effectively suppress deformation of the solid polymer electrolyte membrane.

Further, the second electrode is stacked with respect to the joint body formed on the suction/heating surface by using the heating plate, to thereby form the stack body. By moving the heating plate closer to the suction/heating plate directly, the above joining operation can be performed by pressing and heating the stack body. Accordingly, it is possible to improve the efficiency in producing the membrane electrode assembly.

Further, an apparatus for producing the membrane electrode assembly to which the method of producing the membrane electrode assembly is applied is also included in the present invention. That is, according to another aspect of the present invention, there is provided an apparatus for producing a membrane electrode assembly including a solid polymer electrolyte membrane, a porous first electrode and a porous second electrode, the first electrode and the second electrode being joined to respective both sides of the solid polymer electrolyte membrane. Each of the first electrode and the second electrode includes a gas diffusion layer and an electrode catalyst layer. The apparatus includes a suction/heating plate having a suction unit and a heating unit. The suction/heating plate is configured to attract by suction and heat the solid polymer electrolyte membrane stacked on the first electrode, through the first electrode placed on a suction/heating surface of the suction/heating plate and then join the first electrode to one surface of the solid polymer electrolyte membrane to thereby form a joint body. Further, the apparatus includes a heating plate configured to press and heat a stack body including the solid polymer electrolyte membrane of the joint body and the second electrode together, in a stacking direction between the suction/heating surface and the heating plate to thereby join the second electrode to another surface of the solid polymer electrolyte membrane.

In the apparatus for producing the membrane electrode assembly, as described above, it is possible to easily suppress positional deviation between the first electrode, the solid polymer electrolyte membrane, and second electrode, and deformation of the solid polymer electrolyte membrane. Thus, it is possible to obtain the membrane electrode assembly having excellent quality.

The apparatus for producing the membrane electrode assembly may further include a transportation unit configured to transport the first electrode and place the first electrode on the suction/heating surface, transport the solid polymer electrolyte membrane and place the solid polymer electrolyte membrane on the first electrode attracted to the suction/heating surface by suction, transfer the joint body from the suction/heating surface, transport the second electrode and place the second electrode on the suction/heating surface, and transport the joint body and place the joint body on the second electrode attracted to the suction/heating surface by suction.

In this case, it is possible to join the second electrode and the joint body (solid polymer electrolyte membrane) while effectively suppressing the positional deviation between the second electrode and the joint body, and simplify the structure of the apparatus for producing the membrane electrode assembly.

The above apparatus for producing the membrane electrode assembly may further include a transportation unit configured to transport the first electrode and place the first electrode on the suction/heating surface, and also configured to transport the solid polymer electrolyte membrane and place the solid polymer electrolyte membrane on the first electrode attracted to the suction/heating surface by suction, and the heating plate may be configured to move closer to the joint body attracted to the suction/heating surface by suction, in a state where the second electrode is attracted to the heating plate by suction.

In this case, it is possible to join the second electrode and the joint body (solid polymer electrolyte membrane) while effectively suppressing the positional deviation between the second electrode and the joint body, and improve the efficiency of producing the membrane electrode assembly.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a method of and an apparatus for producing a membrane electrode assembly according to the present invention will be described with reference to the accompanying drawings.

Figure 1:
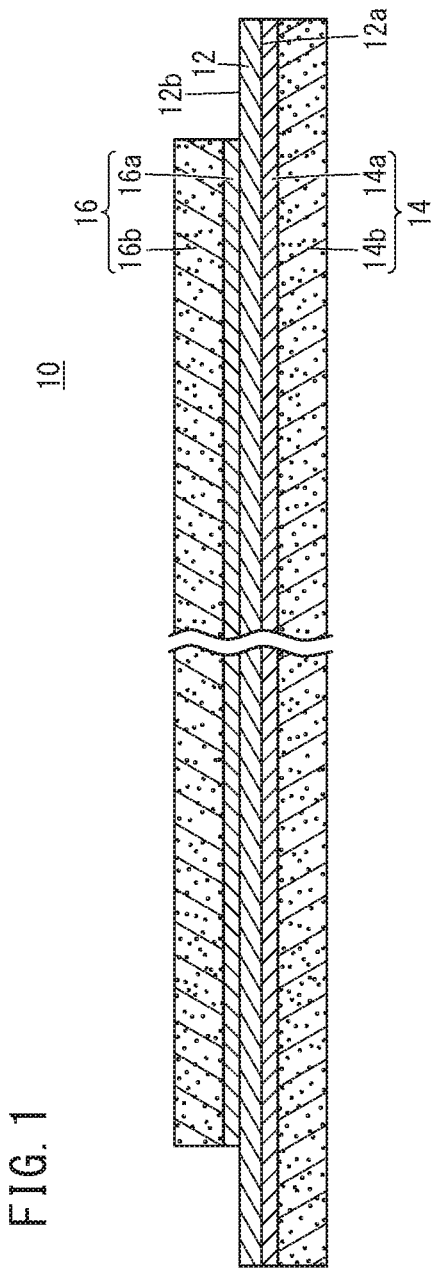
FIG. 1 is a cross sectional view schematically showing a membrane electrode assembly obtained by a method of producing a membrane electrode assembly according to a first embodiment and a second embodiment of the present invention.

FIG. 1 is a cross sectional view schematically showing a membrane electrode assembly (MEA) 10 obtained by a method of producing a membrane electrode assembly according to a first embodiment and a second embodiment (hereinafter also simply referred to as the "production method"). For example, the MEA 10 includes a solid polymer electrolyte membrane (cation ion exchange membrane) 12 as a thin membrane of perfluorosulfonic acid impregnated with water, and a porous anode 14 (first electrode) and a porous cathode 16 (second electrode) sandwiching the solid polymer electrolyte membrane 12. A fluorine based electrolyte may be used as the solid polymer electrolyte membrane 12. Alternatively, a HC (hydrocarbon) based electrolyte may be used as the solid polymer electrolyte membrane 12.

The anode 14 includes a first electrode catalyst layer 14a joined to one surface 12a of the solid polymer electrolyte membrane 12, and a first gas diffusion layer 14b stacked on the first electrode catalyst layer 14a. The first electrode catalyst layer 14a and the first gas diffusion layer 14b have the same surface size or planar size. The surface size of the first electrode catalyst layer 14a and the surface size of the first gas diffusion layer 14b are the same as or less than the surface size of the solid polymer electrolyte membrane 12.

The cathode 16 includes a second electrode catalyst layer 16a joined to a surface 12b of the solid polymer electrolyte membrane 12, and a second gas diffusion layer 16b stacked on the second electrode catalyst layer 16a. The second electrode catalyst layer 16a and the second gas diffusion layer 16b have the same outer size.

Further, the surface size (outer size) of the cathode 16 is smaller than the surface sizes (outer sizes) of the solid polymer electrolyte membrane 12 and the anode 14. That is, the MEA 10 is the so-called stepped type of MEA, which has different sizes of components. Instead of adopting the above structure, the surface size of the anode 14 may be smaller than the surface sizes of the solid polymer electrolyte membrane 12 and the cathode 16. The anode 14 and the cathode 16 may have substantially the same surface size.

The first electrode catalyst layer 14a includes platinum alloy supported on porous carbon particles, and the carbon particles are deposited uniformly on the surface of the first gas diffusion layer 14b to thereby form the first electrode catalyst layer 14a. The first gas diffusion layer 14b comprises a carbon paper, carbon cloth, etc. The second electrode catalyst layer 16a includes platinum alloy supported on porous carbon particles, and the carbon particles are deposited uniformly on the surface of the second gas diffusion layer 16b to thereby form the second electrode catalyst layer 16a. The second gas diffusion layer 16b comprises a carbon paper, carbon cloth, etc.

Next, an apparatus for producing the membrane electrode assembly according to the first embodiment (hereinafter also simply referred to as the "production apparatus") 20 will be described with reference to FIGS. 2 to 9. In order to obtain the MEA 10, the production apparatus 20 has a structure which makes it possible to join the anode 14 and the cathode 16 on both sides of the solid polymer electrolyte membrane 12. Specifically, the production apparatus 20 includes a suction/heating plate 26 having a first suction unit 22 and a first heating unit 24, a heating plate 30 having a second heating unit 28 (see FIG. 9), a transportation unit 32, a cleaner 34 (see FIG. 7), and cameras 36 (see FIG. 8) as main components.

For example, the suction/heating plate 26 is a plate of metal, etc. One main surface of the suction/heating plate 26 is a suction/heating surface 26a. The first suction unit 22 includes a plurality of through holes 40 passing through the suction/heating plate 26 in the thickness direction, a chamber 44 formed by a housing 42 attached to a back surface 26b of the suction/heating surface 26a, a vacuum pump 46 for reducing the pressure in the chamber 44, and a connection channel 48 connecting the chamber 44 and the vacuum pump 46.

One end of each of the through holes 40 is opened to the suction/heating surface 26a, and the other end of each of the through holes 40 is connected to the chamber 44. Therefore, in the first suction unit 22, by driving the vacuum pump 46 to reduce the pressure in the chamber 44, a suction target such as the anode 14 can be attracted to the suction/heating surface 26a by suctioning through the through holes 40. The details of the suction target will be described later. It should be noted that the first suction unit 22 is not limited to have the above structure as long as the first suction unit 22 can provide the suction/heating surface 26a with a suction function.

The first heating unit 24 is a heater, etc. provided inside the suction/heating plate 26. For example, it is possible to raise the temperature of the suction/heating surface 26a up to a temperature where the solid polymer electrolyte membrane 12 can be joined to each of the anode 14 and the cathode 16 (hereinafter also referred to as the "joining temperature"). It should be noted that the first heating unit 24 is not limited to the heater as long as the first heating unit 24 can provide a heating function to the suction/heating surface 26a.

Figure 9:
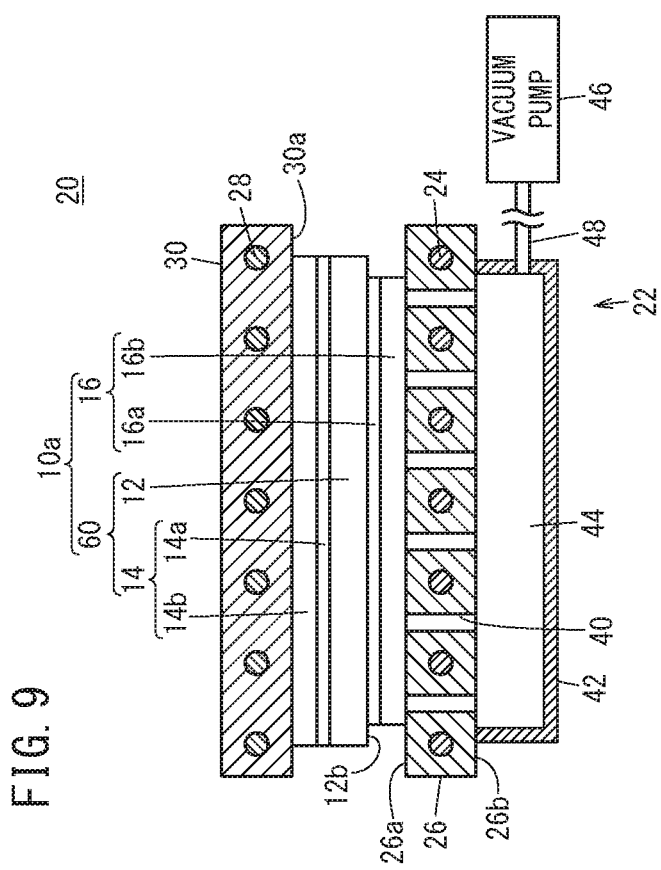
FIG. 9 is a view showing a second joining step of pressing and heating a stack body formed by stacking the joint body and the cathode in FIG. 8 together, between the suction/heating surface and a heating plate, and joining the cathode and the solid polymer electrolyte membrane together, according to the first embodiment.

As shown in FIG. 9, for example, the heating plate 30 is a plate of metal, etc. The heating plate 30 can relatively move in a direction closer to or away from the suction/heating surface 26a of the suction/heating plate 26 by a pressurizing mechanism (not shown) such as a servo press, etc. For example, the second heating unit 28 has the same structure as the first heating unit 24.

Therefore, as described later, the suction/heating plate 26 and the heating plate 30 can heat a stack body 10a interposed between the heating plate 30 and the suction/heating surface 26a up to the joining temperature, and presses the stack body 10a in the stacking direction.

The transportation unit 32 includes transportation plates 50a, 50b having a second suction unit (not shown), and a drive mechanism (not shown) for moving the transportation plates 50a, 50b. Hereinafter, in the case where there is no need to make any distinctions between the transportation plates 50a, 50b, these transportation plates 50a, 50b are also referred to as the "transportation plate 50", collectively. For example, the second suction unit has the same structure as the first suction unit 22, and a suction target such as the anode 14 can be attracted to a main surface 52 of the transportation plate 50 by suction. The details of the transportation target will be described later.

That is, in the transportation unit 32, in the state where the transportation target is suctioned and attracted to the main surface 52 by the second suction unit, the transportation plate 50 is moved by the drive mechanism, and thereafter a suctioned state by the second suction unit is released, whereby it is possible to transport the transportation target to a desired position.

The cleaner 34 performs air-suction while blowing away foreign materials, e.g., by an air blow, to thereby remove the foreign materials from the surface of the solid polymer electrolyte membrane 12, the surface of the first electrode catalyst layer 14a of the anode 14, and the surface of the second electrode catalyst layer 16a of the cathode 16 for cleaning.

The cameras 36 capture images of a suction target suctioned on the suction/heating surface 26a of the suction heating plate 26, and/or a transportation target suctioned on the main surface 52 of the transportation plate 50. Based on the image data captured in this process, it is possible to detect the stack position where the suction target and the transportation target are stacked together. Therefore, by moving the transportation unit 32 to the detected stack position, it is possible to stack the suction target and the transportation target in a desired positional relationship.

Figure 2:
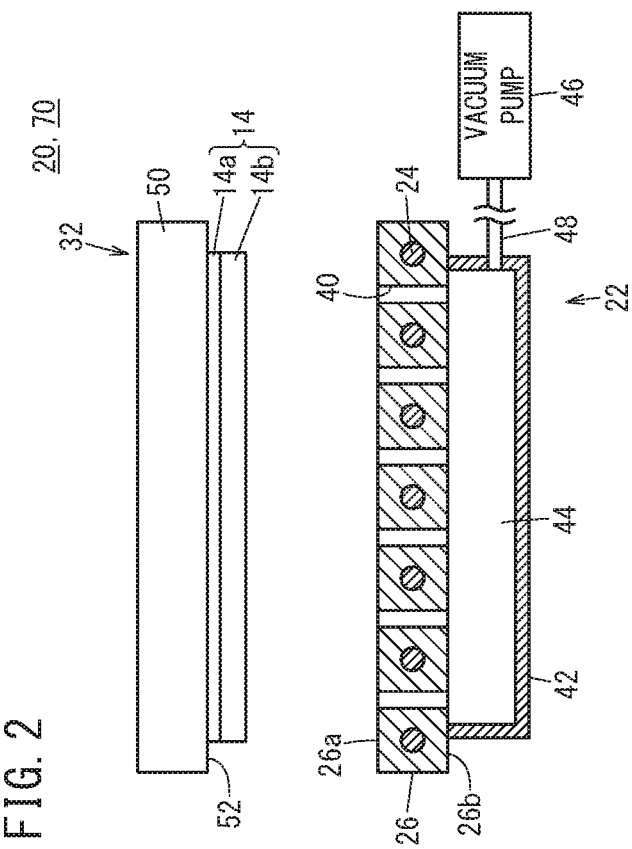
FIG. 2 is a view showing steps of transporting an anode and placing the anode on a suction/heating surface of a suction/heating plate by a transportation unit.

Next, a production method according to the first embodiment using the production apparatus 20 will be described. Firstly, as shown in FIG. 2, with the transportation unit 32, in the state where the anode 14 (transportation target) is attracted to the main surface 52 of the transportation plate 50 by suction, the anode 14 is transported, and placed on the suction/heating surface 26a of the suction/heating plate 26. At this time, the anode 14 is placed in a manner that the first gas diffusion layer 14b of the anode 14 faces the suction/heating surface 26a. The anode 14 (suction target) placed on the suction/heating surface 26a is suctioned and attracted to the suction/heating surface 26a by the first suction unit 22.

Figure 3:
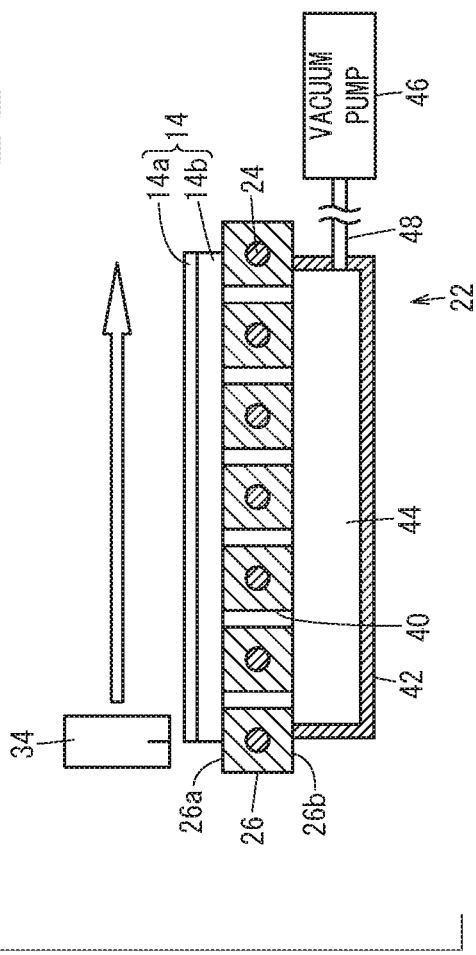
FIG. 3 is a view showing a step of cleaning a surface of a first electrode catalyst layer of an anode in FIG. 2 with a cleaner.

Next, as shown in FIG. 3, the surface of the first electrode catalyst layer 14a of the anode 14 is cleaned by moving the cleaner 34 relative to the surface of the first electrode catalyst layer 14a of the anode 14 in the direction indicated by an arrow.

Figure 4:
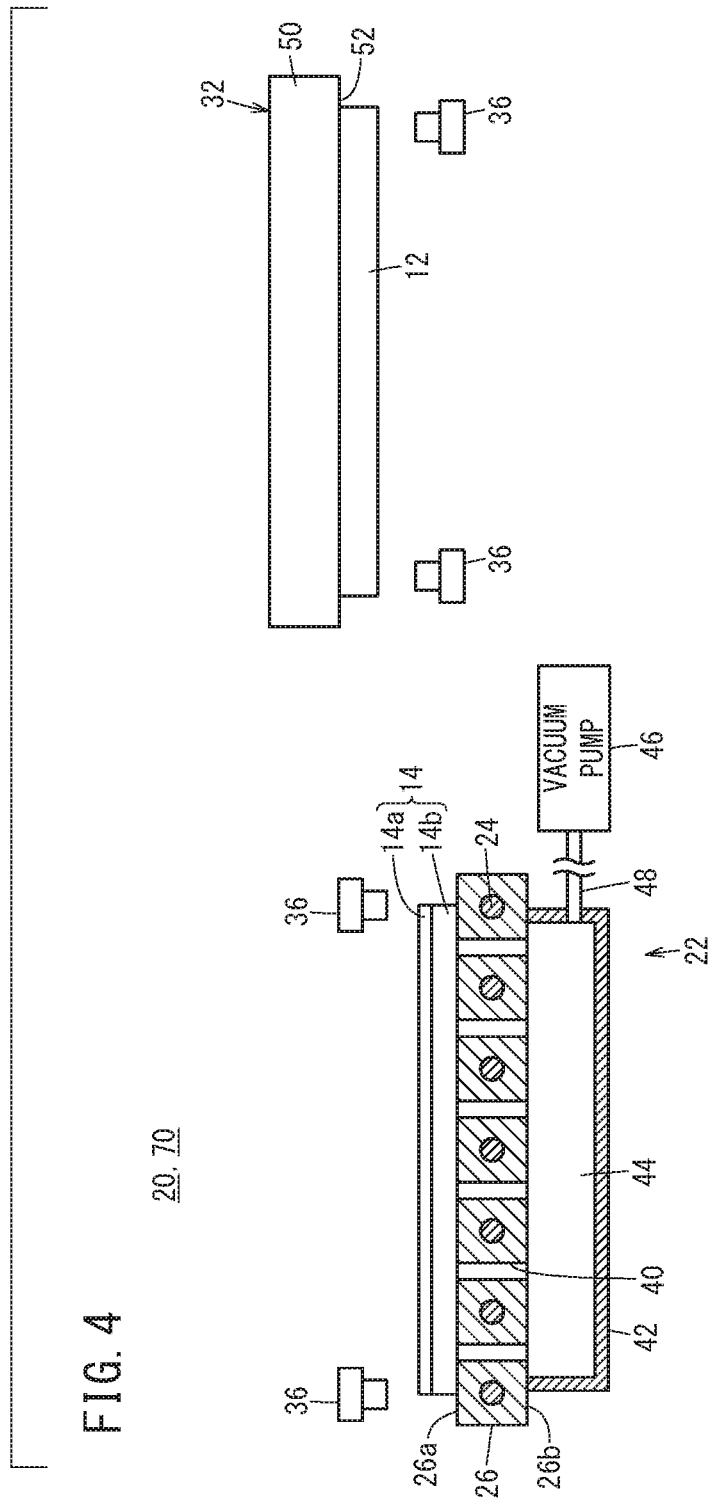
FIG. 4 is a view showing a step of capturing an image of the anode in FIG. 3 and an image of a solid polymer electrolyte membrane in a state where the solid polymer electrolyte membrane is suctioned by the transportation unit, using cameras.
Figure 5:
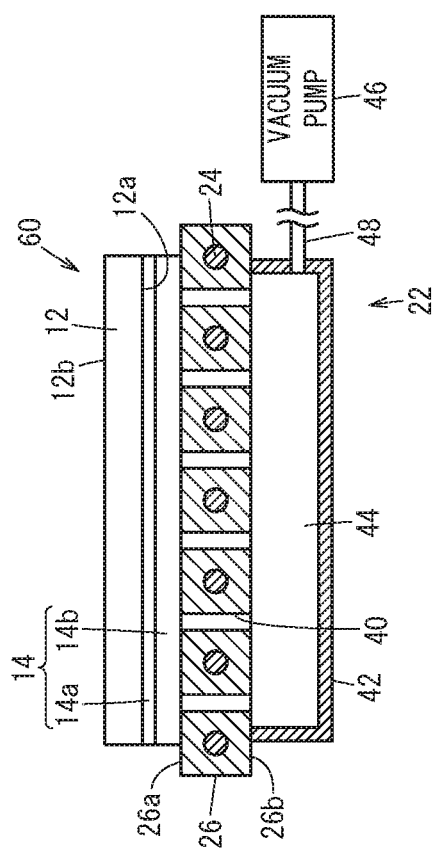
FIG. 5 is a view showing a first joining step of joining the anode and the solid polymer electrolyte membrane together in FIG. 4 to thereby form a joint body.

Next, as shown in FIG. 4, an image of the anode 14 on the suction/heating surface 26a and an image of the solid polymer electrolyte membrane 12 attracted to the main surface 52 of the transportation plate 50 by suction with the transportation unit 32 are captured by the cameras 36. Then, the transportation unit 32 is driven in accordance with the stack position detected based on the captured image data. In this manner, as shown in FIG. 5, the solid polymer electrolyte membrane 12 can be stacked on the anode 14 placed on the suction/heating surface 26a so as to have a desired positional relationship. In this regard, as described above, since the surface of the first electrode catalyst layer 14*a* of the anode 14 is cleaned, it is possible to prevent foreign materials, etc. from being present between the surface of the first electrode catalyst layer 14*a* and the solid polymer electrolyte membrane 12.

As described above, since the anode 14 has porosity, the solid polymer electrolyte membrane 12 stacked on the anode 14 is suctioned on the suction/heating surface 26*a* through the anode 14. By this suction force, the solid polymer electrolyte membrane 12 is pressed against the anode 14, and the state where the anode 14 and the solid polymer electrolyte membrane 12 are stacked together in the desired positional relationship is maintained (the anode 14 and the solid polymer electrolyte membrane 12 are fixedly positioned).

Further, heat of the suction/heating surface 26*a* heated by the first heating unit 24 is transmitted to the solid polymer electrolyte membrane 12 through the anode 14. At this time, since the shape of the solid polymer electrolyte membrane 12 is maintained by the suction force, thermal deformation of the solid polymer electrolyte membrane 12 is suppressed.

It should be noted that when to raise the temperature of the suction/heating surface 26*a* by the first heating unit 24 is not limited specially. The temperature of the suction/heating surface 26*a* may be raised before placing the anode 14 and/or the solid polymer electrolyte membrane 12 on the suction/heating surface 26*a*. Alternatively, the temperature of the suction/heating surface 26*a* may be raised after placing the anode 14 and/or the solid polymer electrolyte membrane 12 on the suction/heating surface 26*a*.

In the state where the anode 14 and the solid polymer electrolyte membrane 12 are attracted by suction, the anode 14 and the solid polymer electrolyte membrane 12 are heated up to the joining temperature, whereby it is possible to join the first electrode catalyst layer 14*a* of the anode 14 to one surface 12*a* of the solid polymer electrolyte membrane 12 to thereby form a joint body 60 (first joining step).

Figure 6:
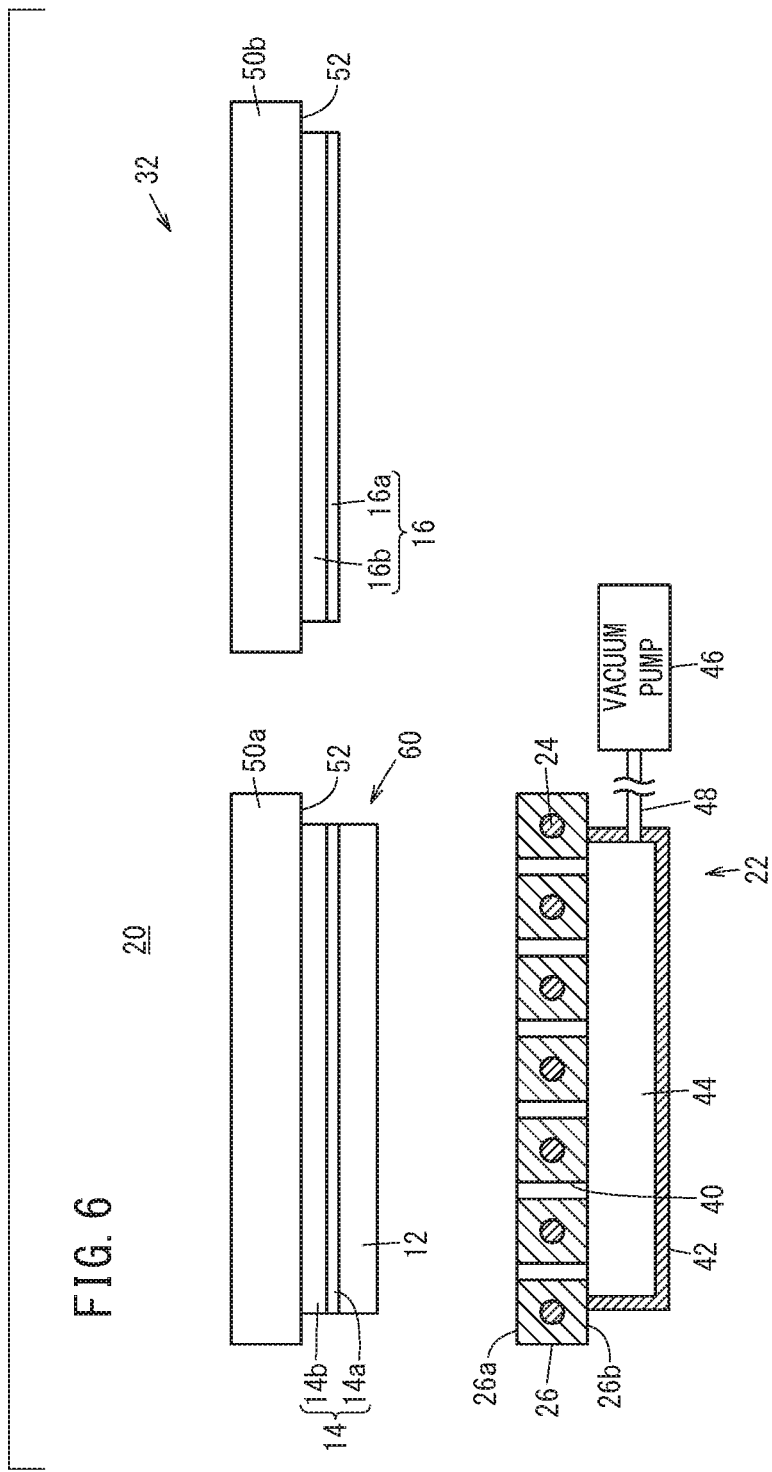
FIG. 6 is a view showing a step of transferring the joint body in FIG. 5 to the transportation unit, and a step of transporting a cathode by the transportation unit.

Next, as shown in FIG. 6, the joint body 60 (transportation target) is transferred from the suction heating surface 26*a* to the transportation plate 50*a* of the transportation unit 32. At this time, the anode 14 of the joint body 60 faces the main surface 52 of the transportation plate 50*a*.

Further, in the state where the cathode 16 (transportation target) is suctioned and attracted to the main surface 52 of the transportation plate 50*b*, the cathode 16 is transported by the transportation unit 32. After the joint body 60 is transferred from the suction/heating surface 26*a* to the transportation plate 50*a*, the cathode 16 is placed on the suction heating surface 26*a* (see FIG. 7). At this time, the cathode 16 is placed in a manner that the second gas diffusion layer 16*b* of the cathode 16 faces the suction/heating surface 26*a*. The cathode 16 (suction target) placed on the suction heating surface 26*a* is suctioned and attracted to the suction/heating surface 26*a* by the first suction unit 22.

Figure 7:
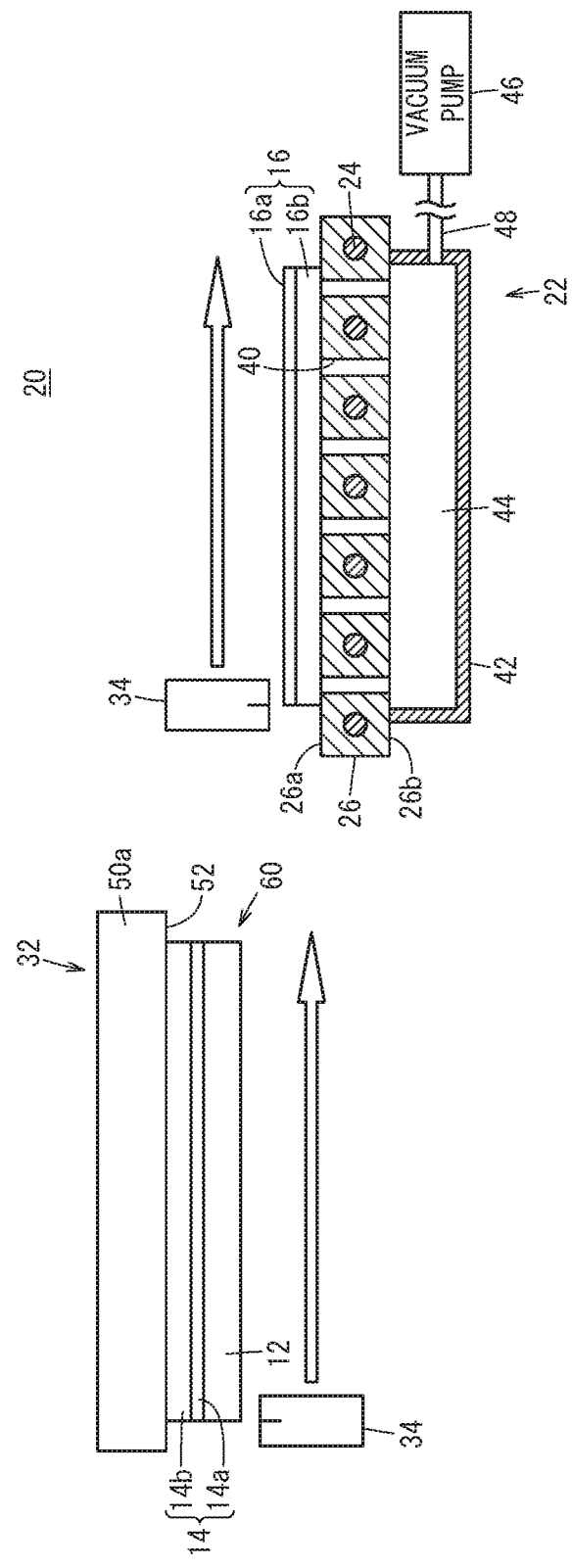
FIG. 7 is a view showing a step of placing and suctioning the cathode on the suction/heating surface after transferring the joint body in FIG. 6 to the transportation unit, and thereafter, a step of cleaning a surface of a second electrode catalyst layer of the cathode and a surface of a solid polymer electrolyte membrane of the joint body using the cleaner.

Next, as shown in FIG. 7, the surface of the solid polymer electrolyte membrane 12 of the joint body 60 suctioned on the main surface 52 of the transportation plate 50*a* is cleaned by moving the cleaner 34 relative to the surface of the solid polymer electrolyte membrane 12 in the direction indicated by the arrow. Likewise, the surface of the second electrode catalyst layer 16*a* of the cathode 16 suctioned on the suction/heating surface 26*a* is cleaned by the cleaner 34.

Figure 8:
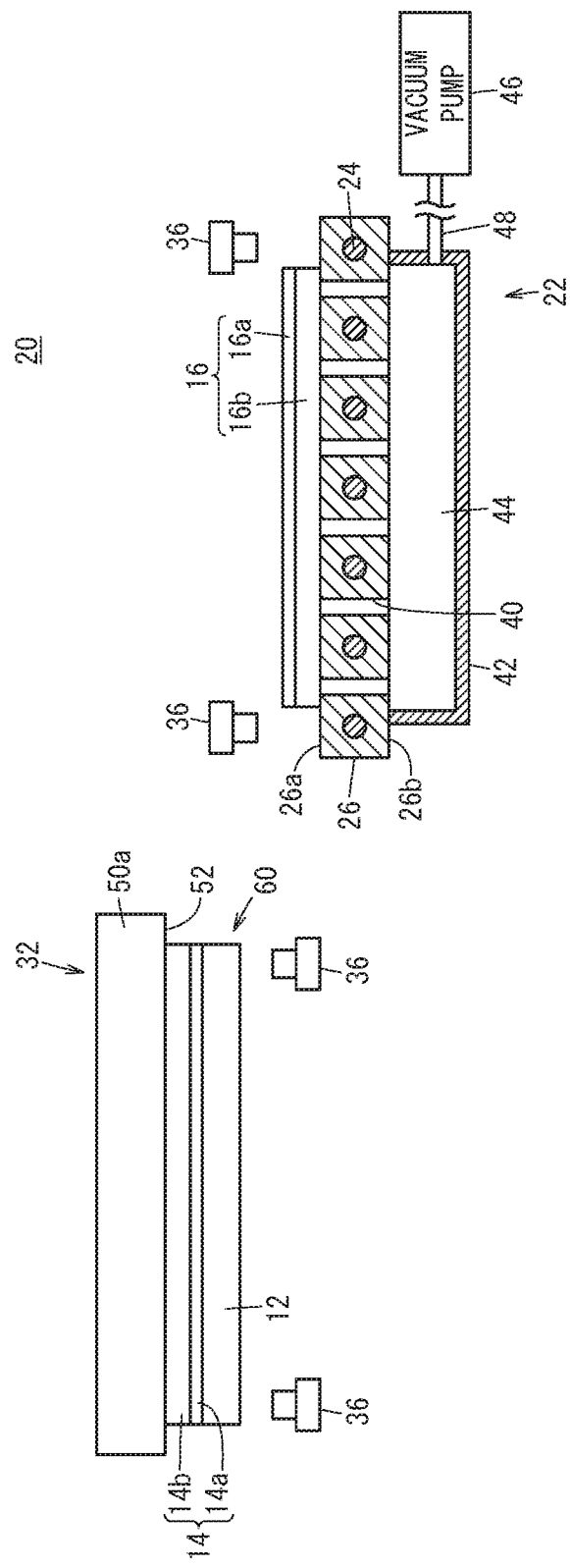
FIG. 8 is a view showing a step of capturing images of the joint body and the cathode in FIG. 7 by the cameras.

Next, as shown in FIG. 8, an image of the cathode 16 suctioned on the suction/heating surface 26*a* and an image of the joint body 60 suctioned on the main surface 52 of the transportation plate 50*a* by the transportation unit 32 are captured by the camera 36. Then, the transportation unit 32 is driven in accordance with the stack position detected based on the captured image data. Thus, it is possible to stack the joint body 60 on the cathode 16 so as to have a desired positional relationship, whereby the stack body 10*a* is formed on the suction/heating surface 26*a* (see FIG. 9). In this regard, as described above, since the surface of the solid polymer electrolyte membrane 12 of the joint body 60 and the surface of the second electrode catalyst layer 16*a* of the cathode 16 are cleaned, it is possible prevent foreign matters from being present between these surfaces.

In the stack body 10*a* formed in the manner as described above, the joint body 60 is suctioned on the suction/heating surface 26*a* through the porous cathode 16. This suction force maintains the state where the cathode 16 and the joint body 60 are stacked together in the desired positional relationship (the cathode 16 and the solid polymer electrolyte membrane 12 are fixedly positioned).

Next, as shown in FIG. 9, by moving the heating plate 30 heated by the second heating unit 28 closer to the suction/heating surface 26*a*, the stack body 10*a* which is present between the heating plate 30 and the suction/heating surface 26*a* is pressed in the stacking direction and heated. Also at this time, since the shape of the solid polymer electrolyte membrane 12 is maintained by the suction force, thermal deformation of the solid polymer electrolyte membrane 12 is suppressed.

The temperature of the solid polymer electrolyte membrane 12 of the stack body 10*a* pressed and heated as described above reaches the joining temperature, whereby it is possible to join the second electrode catalyst layer 16*a* of the cathode 16 and the other surface 12*b* of the solid polymer electrolyte membrane 12 together (second joining step). As a result, it is possible to obtain the MEA 10 formed by joining the anode 14 and the cathode 16 on respective both sides of the solid polymer electrolyte membrane 12.

That is, in this production method, in the first joining step, the anode 14 is joined to one surface 12*a* of the solid polymer electrolyte membrane 12 to fixedly position the solid polymer electrolyte membrane 12 and the anode 14 together, and thereafter, in the second joining step, the cathode 16 is joined to the other surface 12*b* of the solid polymer electrolyte membrane 12. In this manner, for example, in comparison with the case where the anode 14, the solid polymer electrolyte membrane 12, and the cathode 16 are simply stacked together and subjected to hot pressing, it is possible to easily suppress positional deviation between these components.

Further, as described above, in the first joining step, one surface 12*a* of the solid polymer electrolyte membrane 12 can be pressed against the anode 14 and heated to thereby join the solid polymer electrolyte membrane 12 and the anode 14 together in a manner that structural component parts other than the anode 14 do not contact the solid polymer electrolyte membrane 12. Therefore, even if the anode 14 is joined to one surface 12*a* of the solid polymer electrolyte membrane 12, for example, unlike the case where hot pressing, etc. is performed using a die (not shown), the solid polymer electrolyte membrane 12 softened by heating is not adhered to the die.

Further, since a suction force from the suction/heating surface 26*a* is applied to the solid polymer electrolyte membrane 12, in a state where positional deviation and/or thermal deformation is suppressed, the solid polymer electrolyte membrane 12 is joined to the anode 14 and the cathode 16. Thus, it is possible to easily join the anode 14, the solid polymer electrolyte membrane 12, and the cathode 16 together in a desired positional relationship, and suppress deformation of the solid polymer electrolyte membrane 12.

As described above, in this production method, it is possible to easily suppress positional deviation between the anode 14, the solid polymer electrolyte membrane 12, and the cathode 16, and also easily suppress deformation of the solid polymer electrolyte membrane 12, and thus the MEA 10 having excellent quality can be obtained.

Further, in the production method according to the first embodiment of the present invention, the joint body 60 is transferred from the suction/heating surface 26a to the transportation plate 50a of the transportation unit 32. After the joint body 60 has been transferred from the suction/heating surface 26a to the transportation plate 50a, the cathode 16 is transported to the suction/heating surface 26a by the transportation plate 50b. That is, the production apparatus 20 according to the first embodiment of the present invention includes the transportation plate 50a and the transportation plate 50b. The joint body 60 is transferred from the suction/heating surface 26a to the transportation plate 50a. After the joint body 60 has been transferred from the suction/heating surface 26a to the transportation plate 50a, the transportation plate 50b transports the cathode 16 to the suction/heating surface 26a.

In the structure, the suction/heating plate 26 can be used to attract the anode 14 by suction, attract the solid polymer electrolyte membrane 12 by suction through the anode 14, attract the cathode 16 by suction, and attract the solid polymer electrolyte membrane 12 (joint body 60) by suction though the cathode 16. Consequently, it becomes possible to simplify the structure of the production apparatus 20.

Next, a production apparatus 70 according to a second embodiment will be described with reference to FIGS. 2 to 5 and 10 to 13. Some of the constituent elements shown in FIGS. 10 to 13 that have functions and advantages identical to or similar to those of the constituent elements shown in FIGS. 2 to 9 are labeled with the same reference numerals, and detailed description thereof is omitted.

Figure 12:
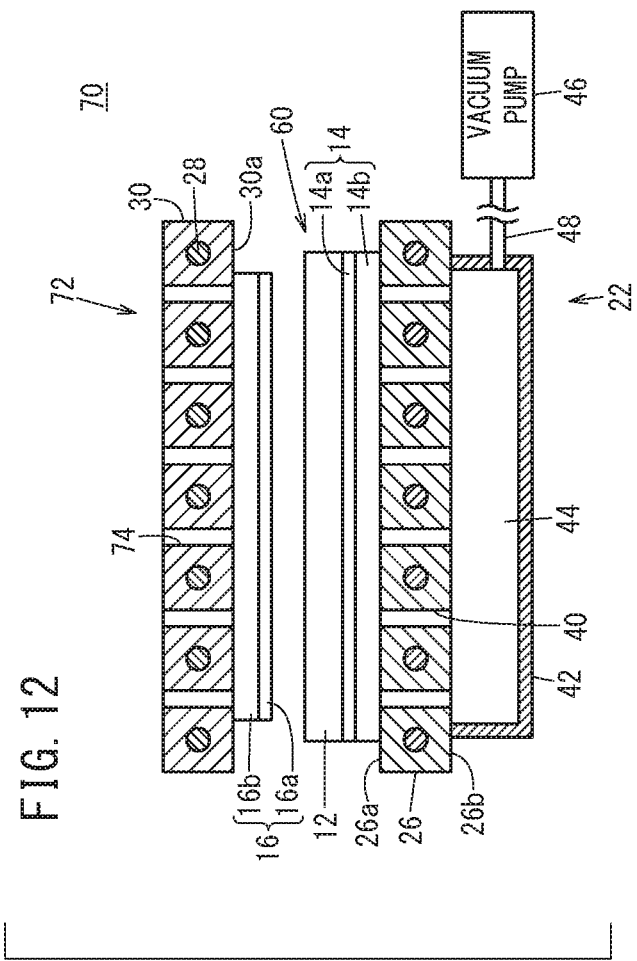
FIG. 12 is a view showing a step of transferring the cathode in FIG. 11 from the transportation unit to the heating plate, and moving the cathode closer to the joint body.
Figure 13:
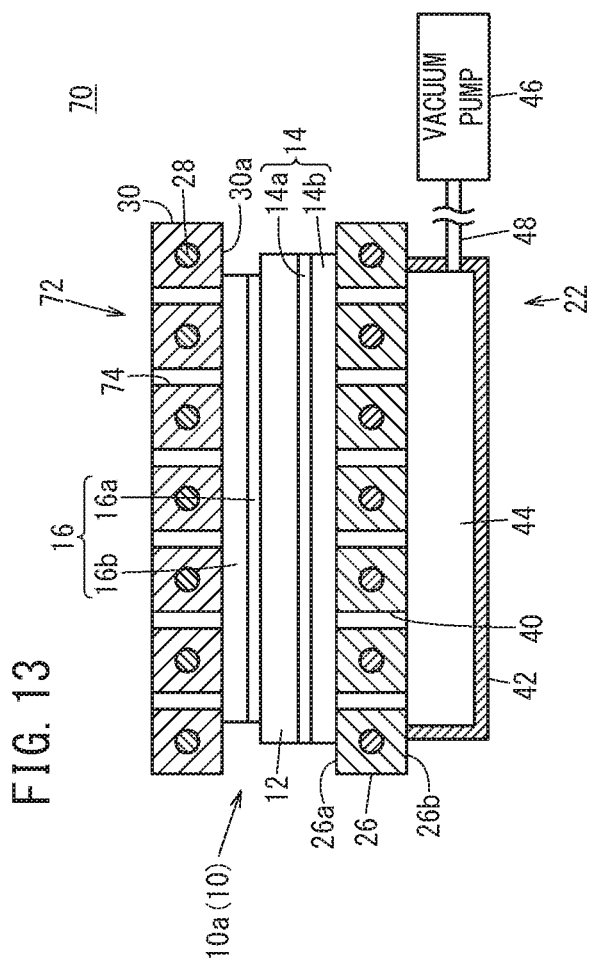
FIG. 13 is a view showing a second joining step of pressing and heating a stack body formed by stacking the joint body in FIG. 12 and the cathode together, between the suction/heating surface and a heating plate, and joining the cathode and the solid polymer electrolyte membrane together, according to the second embodiment.

As shown in FIGS. 12 and 13, the production apparatus 70 is different from the above production apparatus 20 chiefly in that a third suction unit 72 is provided on the above heating plate 30 for allowing the cathode 16 to be attracted to a main surface 30a of the heating plate 30 by suction.

For example, the third suction unit 72 has the same structure as the first suction unit 22. That is, it is possible for the third suction unit 72 to attract the cathode 16 to the main surface 30a by suction through a plurality of through holes 74 formed in the heating plate 30.

Next, a production method according to the second embodiment using the production apparatus 70 will be described. In the production method according to the second embodiment, as shown in FIGS. 1 to 5, a series of processes up to the first joining process can be performed in the same manner as in the case of the production method according to the first embodiment.

Figure 10:
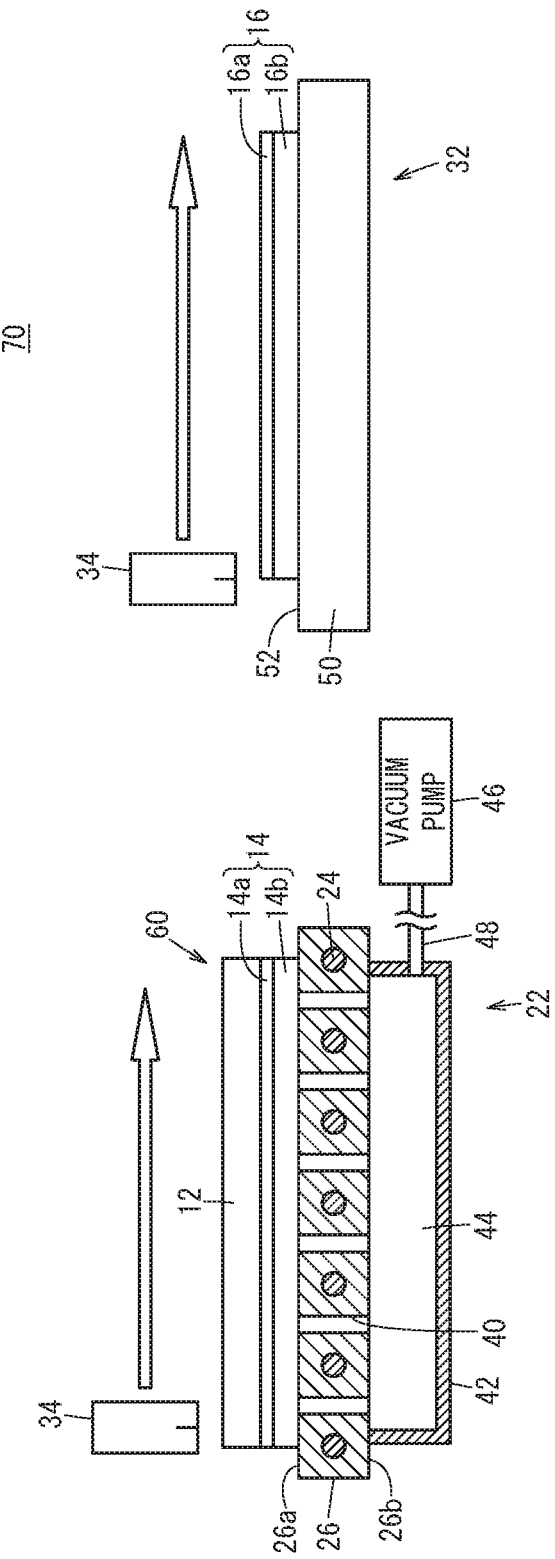
FIG. 10 is a view showing a step of cleaning, with a cleaner, a surface of the solid polymer electrolyte membrane of the joint body in FIG. 5 and a surface of the second electrode catalyst layer of the cathode attracted by suction to the transportation unit.

In this manner, after the joint body 60 is formed on the suction/heating surface 26a, as shown in FIG. 10, a surface of the solid polymer electrolyte membrane 12 of the joint body 60 attracted to the suction/heating surface 26a by suction is cleaned by moving the cleaner 34 relative to the surface of the solid polymer electrolyte membrane 12 in a direction indicated by an arrow. Likewise, the surface of the second electrode catalyst layer 16a of the cathode 16 (transportation target) attracted to the main surface 52 of the transportation plate 50 by suction with the transportation unit 32 is cleaned by the cleaner 34.

Figure 11:
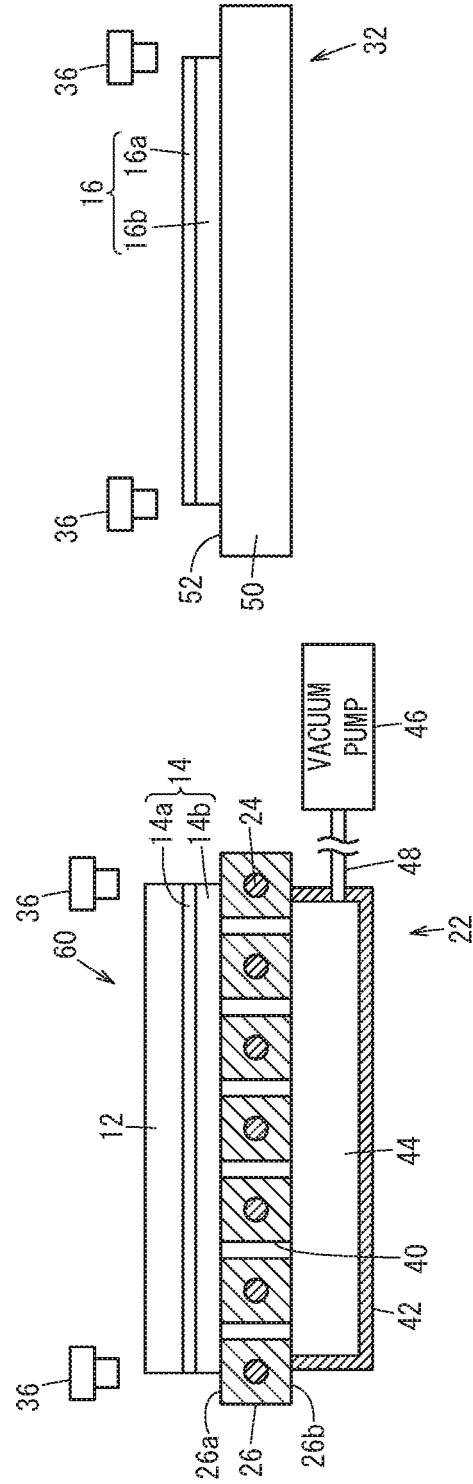
FIG. 11 is a view showing a step of capturing images of the joint body and the cathode in FIG. 10 by the cameras.

Next, as shown in FIG. 11, an image of the joint body 60 suctioned on the suction/heating surface 26a and an image of the cathode 16 suctioned on the main surface 52 of the transportation plate 50 by the transportation unit 32 are captured by the cameras 36. As described later, the transportation unit 32, etc. is driven in accordance with the stack position detected based on the image data captured as described above. In this manner, by stacking the cathode 16 on the joint body 60 so as to have the desired positional relationship, it is possible to form the stack body 10a on the suction/heating surface 26a (see FIGS. 12 and 13). In this regard, as described above, since the surface of the solid polymer electrolyte membrane 12 of the joint body 60 and the surface of the second electrode catalyst layer 16a of the cathode 16 are cleaned, it is possible to avoid foreign materials, etc. from being present between these surfaces.

Next, as shown in FIG. 12, the cathode 16 is transferred from the transportation plate 50 to the main surface 30a of the heating plate 30 by the transportation unit 32, and the cathode 16 is attracted to the main surface 30a by suction. At this time, the cathode 16 is placed in a manner that the second gas diffusion layer 16b of the cathode 16 faces the main surface 30a.

Next, the heating plate 30 with the cathode 16 being attracted by suction thereto is moved closer to the joint body 60 attracted to the suction/heating surface 26a by suction. In this manner, as shown in FIG. 13, the joint body 60 and the cathode 16 are stacked together to thereby form the stack body 10a. In the stack body 10a formed in the manner described above, the suction force is applied to the solid polymer electrolyte membrane 12 from both of the suction/heating surface 26a and the main surface 30a of the heating plate 30. Therefore, positional deviation and/or heat deformation is suppressed.

In a state where the temperature of the heating plate 30 is raised by the second heating unit 28, by moving the heating plate 30 much closer to the suction/heating surface 26a, it is possible to press and heat the stack body 10a, and join the cathode 16 to the other surface 12b of the solid polymer electrolyte membrane 12 (second joining step). As a result, it is possible to obtain the MEA 10 formed by joining the anode 14 and the cathode 16 to respective both sides of the solid polymer electrolyte membrane 12.

That is, in the production method according to the second embodiment, in the same manner as in the case of the production method according to the first embodiment, it is possible to easily suppress positional deviation between the anode 14, the solid polymer electrolyte membrane 12, and the cathode 16, and also easily suppress deformation of the solid polymer electrolyte membrane 12, and thus the MEA 10 having excellent quality can be obtained.

Further, in the production method according to the second embodiment, by providing the third suction unit 72 on the heating plate 30, it is possible to stack the cathode 16 on the joint body 60 formed on the suction/heating surface 26a, using the heating plate 30, to thereby form the stack body 10a. Further, since the solid polymer electrolyte membrane 12 and the cathode 16 can be joined together by moving the heating plate 30 closer to the suction/heating surface 26a directly, it is possible to improve the efficiency of producing the MEA 10.

The present invention is not limited to the above described embodiments. It is a matter of course that various structures may be adopted without departing from the scope of the present invention.

For example, in the production method according to the first embodiment and the second embodiment, in the first joining step, the anode 14 as the first electrode is joined to one surface 12a of the solid polymer electrolyte membrane 12. Further, in the second joining step, the cathode 16 as the second electrode is joined to the other surface 12a of the solid polymer electrolyte membrane 12.

However, in the first joining step, instead of the anode 14, the cathode 16 as the first electrode may be joined to one surface 12a of the solid polymer electrolyte membrane 12. Further, in the second joining step, instead of the cathode 16, the anode 14 as the second electrode may be joined to the other surface 12b of the solid polymer electrolyte membrane 12.

What is claimed is:

1. A method of producing a membrane electrode assembly including a solid polymer electrolyte membrane, a porous first electrode and a porous second electrode, the first electrode and the second electrode being joined to respective both sides of the solid polymer electrolyte membrane, the first electrode and the second electrode each including a gas diffusion layer and an electrode catalyst layer,
    the method comprising:
        a first joining step of attracting by suction and heating the solid polymer electrolyte membrane stacked on the first electrode, through the first electrode placed on a suction/heating surface of a suction/heating plate having a suction unit and a heating unit, and then joining the first electrode to one surface of the solid polymer electrolyte membrane to thereby form a joint body; and
        a second joining step of pressing and heating a stack body including the solid polymer electrolyte membrane of the joint body and the second electrode stacked together, in a stacking direction between the suction/heating surface and a heating plate, to thereby join the second electrode to another surface of the solid polymer electrolyte membrane.

2. The method of producing the membrane electrode assembly according to claim 1,
    further comprising, between the first joining step and the second joining step, the steps of:
        transferring the joint body from the suction/heating surface to a transportation unit;
        after the joint body is transferred from the suction/heating surface, placing the second electrode on the suction/heating surface and attracting the second electrode by suction to the suction/heating surface; and
        stacking the joint body on the second electrode attracted to the suction/heating surface by suction, to thereby form the stack body,
    wherein, in the second joining step, the stack body is pressed and heated in a state where the solid polymer electrolyte membrane is attracted by suction through the second electrode.

3. The method of producing the membrane electrode assembly according to claim 1,
    wherein the heating plate is configured to attract the second electrode by suction,
    the method further comprising, between the first joining step and the second joining step, the step of, in a state where the joint body is attracted to the suction/heating surface by suction, moving the heating plate with the second electrode being attracted by suction thereto, closer to the joint body, and then stacking the joint body and the second electrode together to thereby form the stack body,
    wherein, in the second joining step, in a state where the solid polymer electrolyte membrane is attracted by suction through the first electrode and the second electrode by the suction/heating surface and the heating plate, the stack body is pressed and heated by the suction/heating surface and the heating plate.

* * * * *